(12) United States Patent
Do et al.

(10) Patent No.: US 8,756,209 B2
(45) Date of Patent: Jun. 17, 2014

(54) COMPUTING RESOURCE ALLOCATION BASED ON QUERY RESPONSE ANALYSIS IN A NETWORKED COMPUTING ENVIRONMENT

(75) Inventors: Lydia M. Do, Raleigh, NC (US); Rick A. Hamilton, II, Charlottesville, VA (US); Brian M. O'Connell, RTP, NC (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/343,258

(22) Filed: Jan. 4, 2012

(65) Prior Publication Data
US 2013/0173597 A1    Jul. 4, 2013

(51) Int. Cl.
*G06F 17/30* (2006.01)

(52) U.S. Cl.
USPC .......................................... 707/705; 707/722

(58) Field of Classification Search
USPC .................................................. 707/705, 722
See application file for complete search history.

(56) References Cited

U.S. PATENT DOCUMENTS

| | | | |
|---|---|---|---|
| 7,308,437 B2 | 12/2007 | Day et al. | |
| 7,574,496 B2 | 8/2009 | McCrory et al. | |
| 7,743,040 B2 * | 6/2010 | Rys et al. | 707/705 |
| 7,849,227 B2 * | 12/2010 | Kashiyama et al. | 710/1 |
| 7,917,547 B2 | 3/2011 | Hughes et al. | |
| 8,250,198 B2 * | 8/2012 | Zhang et al. | 709/223 |
| 8,280,867 B2 * | 10/2012 | Brown et al. | 707/705 |
| 8,359,305 B1 * | 1/2013 | Burke et al. | 707/706 |
| 8,411,842 B1 * | 4/2013 | Wu et al. | 379/265.11 |
| 2008/0071755 A1 | 3/2008 | Barsness et al. | |
| 2009/0100180 A1 * | 4/2009 | Chidambaran et al. | 709/226 |
| 2009/0254916 A1 | 10/2009 | Bose et al. | |
| 2011/0137805 A1 | 6/2011 | Brookbanks et al. | |

OTHER PUBLICATIONS

Maitland, J., "Keeping Control Isn't Easy", Chapter 4: Cloud-Based Infrastructure, SearchCloudComputing.com, 13 pages.

Mell et al., "The NIST Definition of Cloud Computing", National Institute of Standards and Technology, Information Technology Laboratory, Version 15, Oct. 7, 2009, 2 pages.

Srivastava, U. et al., "Monitoring Stream Properties for Continuous Query Processing", Stanford University, 5 pages. Publication date not cited.

* cited by examiner

*Primary Examiner* — Kim Nguyen
(74) *Attorney, Agent, or Firm* — William E. Schiesser; Keohane & D'Alessandro, PLLC (57) ABSTRACT

An approach for allocating computing resources based on a confidence level associated with responses to queries is provided. In a typical embodiment, a query is received from a querying user, and a search for a response to the query is conducted. A confidence level associated with the response is then determined. If the confidence level of the response does not meet a predetermined threshold, additional computing resources are allocated, and the search and corresponding response are updated (e.g., iteratively). An updated confidence level based on the updated response is then determined. Once the predetermined threshold has been met by the confidence level of the response, the response can be returned to the querying user.

22 Claims, 4 Drawing Sheets

FIG. 4 ated with previous queries submitted by the querying user; comparing the confidence level to a predetermined threshold; responsive to the confidence level not meeting the predetermined threshold, allocating an additional amount of computing resources to the search; and sending the response to the querying user when the confidence level meets the predetermined threshold.
COMPUTING RESOURCE ALLOCATION BASED ON QUERY RESPONSE ANALYSIS IN A NETWORKED COMPUTING ENVIRONMENT

TECHNICAL FIELD

Embodiments of the present invention relate to computing resource allocation. Specifically, embodiments of the present invention relate to confidence-based (e.g., query response analysis) computing resource allocation in a networked computing environment (e.g., a cloud computing environment, a grid computing environment, etc.).

BACKGROUND

Systems that can perform natural language parsing and deep question and answer (DeepQA) may be utilized to help querying users obtain responses to queries. DeepQA illustrates how the growing accessibility of natural language content and the integration and advancement of natural language processing, information retrieval, machine learning, knowledge representation and reasoning, and parallel computation can drive open-domain automatic question and answering technology to provide meaningful answers.

Challenges may exist, however in considering the confidence associated with a given response to a query. For example, the quality of an answer, the time required finding an answer, and the confidence associated with each answer may depend on the amount of computing resources (e.g., the number of processors) allocated for performing the analysis. Currently, challenges existing in providing a system that analyzes query response quality when allocating computing resources.

SUMMARY

In general, embodiments of the present invention provide an approach for allocating computing resources based on a confidence level (e.g., query response analysis) associated with responses to queries. In a typical embodiment, a query is received from a querying user, and a search for a response to the query is conducted. A confidence level associated with the response is then determined (e.g., based on a speed with which the response was obtained, an amount of computing resources utilized to obtain the response, a quantity/types, etc. of database(s) accessed to identify the response, historical data associated with previous queries submitted by the querying users, etc.). If the confidence level of the response does not meet a predetermined threshold, additional computing resources may be allocated, and the search and corresponding response are updated (e.g., iteratively). An updated confidence level based on the updated response is then determined. Once the predetermined threshold has been met by the confidence level of the response, the response can be returned to the querying user.

A first aspect of the present invention provides a computer-implemented method for confidence-based computing resource allocation in a networked computing environment, comprising: receiving a query from a querying user into a computer storage medium; performing a search of one or more databases based on the query to identify a response to the query; determining a confidence level associated with the response based on at least one of the following, a speed with which the response is identified, an amount of computing resources utilized to identify the response, a quantity of the one or more databases accessed to identify the response, or historical data associated with previous queries submitted by the querying user; comparing the confidence level to a predetermined threshold; responsive to the confidence level not meeting the predetermined threshold, allocating an additional amount of computing resources to the search; and sending the response to the querying user when the confidence level meets the predetermined threshold.

A second aspect of the present invention provides a system for confidence-based computing resource allocation in a networked computing environment, comprising: a memory medium comprising instructions; a bus coupled to the memory medium; and a processor coupled to the bus that when executing the instructions causes the system to: receive a query from a querying user into a computer storage medium; perform a search of one or more databases based on the query to identify a response to the query; determine a confidence level associated with the response based on at least one of the following: a speed with which the response is identified, an amount of computing resources utilized to identify the response, a quantity of the one or more databases accessed to identify the response, or historical data associated with previous queries submitted by the querying user; compare the confidence level to a predetermined threshold; responsive to the confidence level not meeting the predetermined threshold, allocate an additional amount of computing resources to the search; and send the response to the querying user when the confidence level meets the predetermined threshold.

A third aspect of the present invention provides a computer program product for confidence-based computing resource allocation in a networked computing environment, the computer program product comprising a computer readable storage media, and program instructions stored on the computer readable storage media, to: receive a query from a querying user into a computer storage medium; perform a search of one or more databases based on the query to identify a response to the query; determine a confidence level associated with the response based on at least one of the following: a speed with which the response is identified, an amount of computing resources utilized to identify the response, a quantity of the one or more databases accessed to identify the response, or historical data associated with previous queries submitted by the querying user; compare the confidence level to a predetermined threshold; responsive to the confidence level not meeting the predetermined threshold, allocate an additional amount of computing resources to the search; and send the response to the querying user when the confidence level meets the predetermined threshold.

A fourth aspect of the present invention provides a method for deploying a system for confidence-based computing resource allocation in a networked computing environment, comprising: providing a computer infrastructure being operable to: receive a query from a querying user into a computer storage medium; perform a search of one or more databases based on the query to identify a response to the query; a confidence level associated with the response based on at least one of the following: a speed with which the response is identified, an amount of computing resources utilized to identify the response, a quantity of the one or more databases accessed to identify the response, or historical data associated with previous queries submitted by the querying user; compare the confidence level to a predetermined threshold; responsive to the confidence level not meeting the predetermined threshold, allocate an additional amount of computing resources to the search; and send the response to the querying user when the confidence level meets the predetermined threshold.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In general, embodiments of the present invention provide an approach for allocating computing resources based on a confidence level (e.g., query response analysis) associated with responses to queries. In a typical embodiment, a query is received from a querying user, and a search for a response to the query is conducted. A confidence level associated with the response is then determined (e.g., based on a speed with which the response was obtained, an amount of computing resources utilized to obtain the response, a quantity/types, etc. of database(s) accessed to identify the response, historical data associated with previous queries submitted by the querying users, etc.). If the confidence level of the response does not meet a predetermined threshold, additional computing resources may be allocated, and the search and corresponding response are updated (e.g., iteratively). An updated confidence level based on the updated response is then determined. Once the predetermined threshold has been met by the confidence level of the response, the response can be returned to the querying user.

Figure 1:
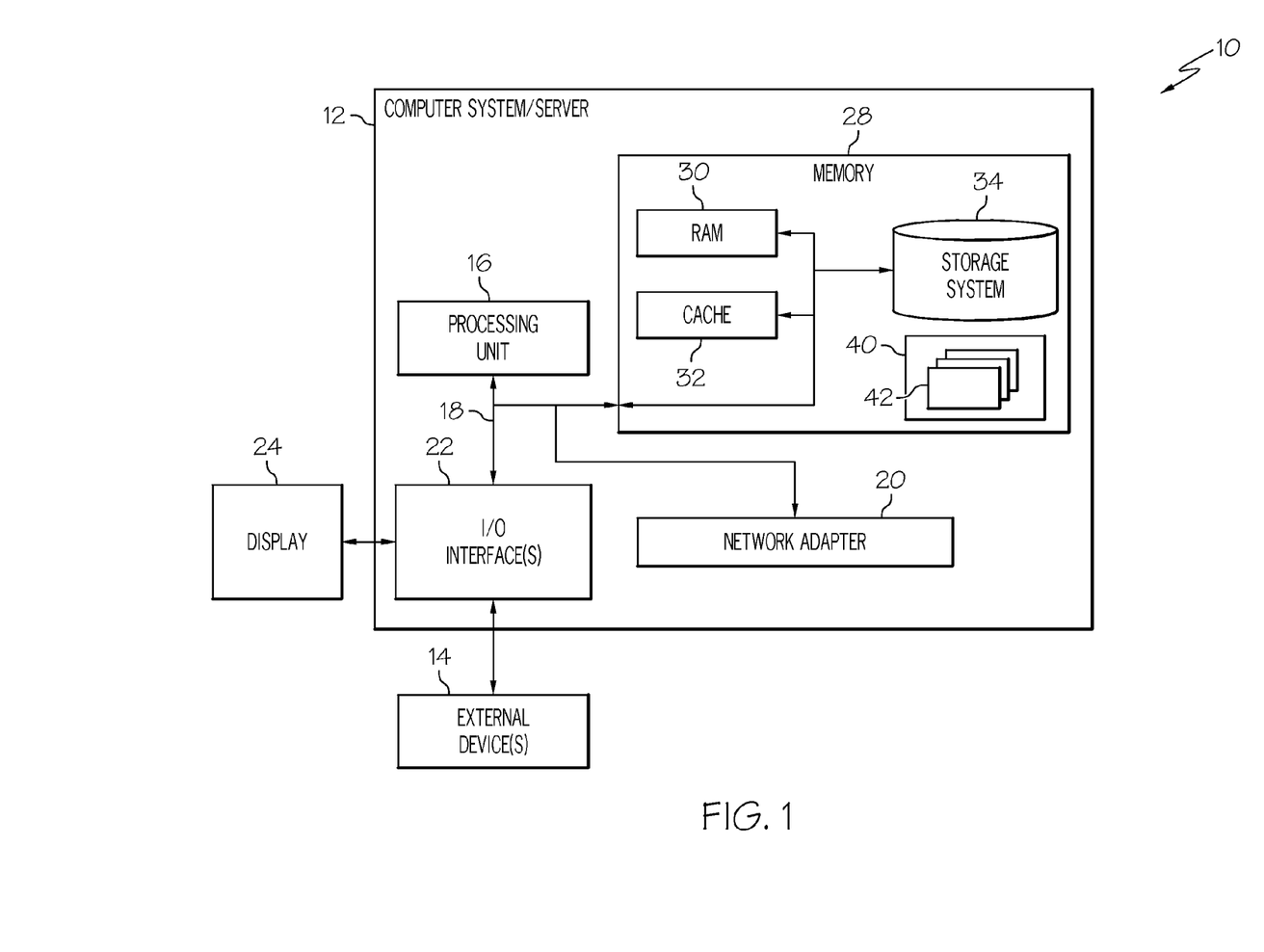
FIG. 1 depicts a computing node according to an embodiment of the present invention.

Referring now to FIG. 1, a schematic of an example of a computing node is shown. Computing node 10 is only one example of a suitable structure computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable structure for use with computer system/server 12 include, but are not limited to, personal computer systems, server computer systems, thin clients, thick clients, hand-held or laptop devices, mobile devices, global positioning systems (GPS), GPS-enable devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable structure instructions, such as program modules, being executed by a computer system. Generally, program modules may include routines, programs, objects, components, logic, data structures, and so on, which perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable structure combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable structure combination of the foregoing.

Computing resource allocation program/utility 40, having a set (at least one) of program modules 42, may be stored in memory 28 by way of example, and not limitation, as well as an operating system, one or more application programs, other program modules, and program data. In general, computing resource allocation program 40 performs the function of the present invention as described herein.

Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
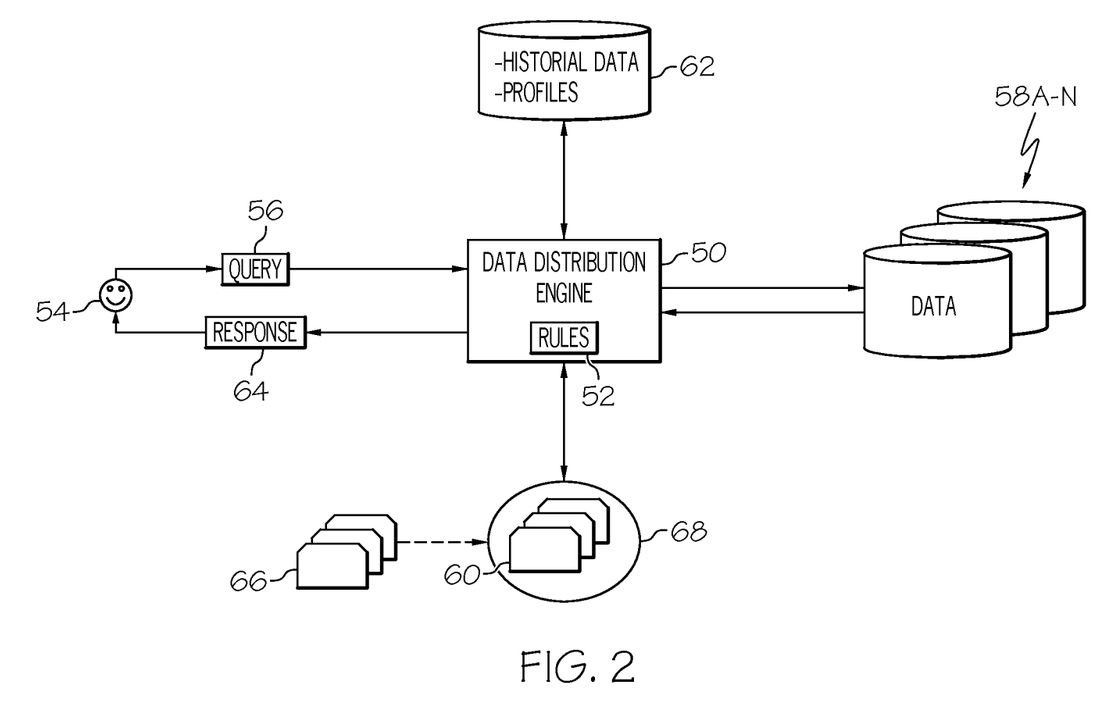
FIG. 2 depicts a system diagram according to an embodiment of the present invention.

Referring now to FIG. 2, a system diagram capable of implementing the functionality discussed herein according to an embodiment of the present invention is shown. It is understood that the teachings recited herein may be practiced within any type of networked computing environment (e.g., a cloud computing environment, or a grid computing environment). A stand-alone computer system/server 12 is shown in FIGS. 1 and 2 for illustrative purposes only. In the event the teachings recited herein are practiced in a networked computing environment, each client need not have a computing resource allocation engine (engine 50). Rather, engine 50 could be loaded on a server or server-capable device that communicates (e.g., wirelessly) with the clients to provide device protection therefor. Regardless, as depicted, engine 50 is shown within computer system/server 12. In general, engine 50 can be implemented as computing resource allocation program/utility 40 on computer system 12 of FIG. 1 and can enable the functions recited herein. As further shown, engine 50 (in one embodiment) comprises a rules and/or computational engine that processes a set (at least one) of rules 52 and/or provides confidence-based computing resource allocation hereunder.

Along these lines, engine 50 may perform multiple functions similar to a general-purpose computer. Specifically, among other functions, engine 50 may (among other things): receive a query 56 from a querying user 54 in a computer storage medium; perform a search of one or more databases 58A-N based on the query 56 to identify a response 64 to the query 56; determine a confidence level associated with the response 64 based on at least one of the following: a speed with which the response 64 is identified, an amount of computing resources 60 (e.g., in resource pool 68) utilized to identify the response 64, a quantity and/or type of the one or more databases 58A-N accessed to identify the response 64, or historical data associated with previous queries submitted by the querying user 54 (e.g., in repository 62); compare the confidence level to a predetermined threshold; responsive to the confidence level not meeting the predetermined threshold, allocate an additional amount of computing resources 66 to the search; send the response 64 to the querying user 54 when the confidence level meets the predetermined threshold; update the search to yield an updated response 64; update the confidence level based on the updated response 64; analyze previous queries from the querying user 54 (e.g., in repository 62) to identify the response 64; access a user 54 profile associated with the querying user 54 to identify the response 64, etc.

Specifically, the approach described herein facilitates the identification, selection, and use of computing resources, such as CPU, memory, number of virtual machines, disks, partitions, and network bandwidth. More particularly, a resource allocator may automatically trigger the use of such resources when the confidence level (e.g., associated with an answer to a query) is below a threshold. In this manner, the user is more likely to obtain useful information. The resource allocator may employ deep question and answer (DeepQA) systems (e.g., systems that answer natural language questions by querying data repositories and applying elements of language processing, information retrieval, and machine learning to arrive at a conclusion). Moreover, embodiments of the present invention describe a way of enhancing such responses, including the use of more computing processors, under various circumstances, so that the answers to queries have higher value (or are acquired faster) than would be arrived at with fewer resources (e.g. fewer processors). This approach is accomplished using components that are automatically triggered based on certain criteria.

Illustrative Example

The details of the proposed invention may best be understood by the following illustrative example. It is understood that this example is intended to be illustrative only and others may exist. This example will be discussed with reference to FIGS. 2-3.

In this example, consider the application of DeepQA technologies as a Resource Allocator (RA 70 of FIG. 3) to show how higher confidence answers may be derived using this technique. Assume that a querying user 54 (e.g., a hardware designer) asks a question such as: "What cell libraries of logical primitives are usually provided by device manufacturer X and Y as part of the service and covered by the terms of a nondisclosure agreement (NDA)? Answer needed in 3 minutes."

Figure 3:
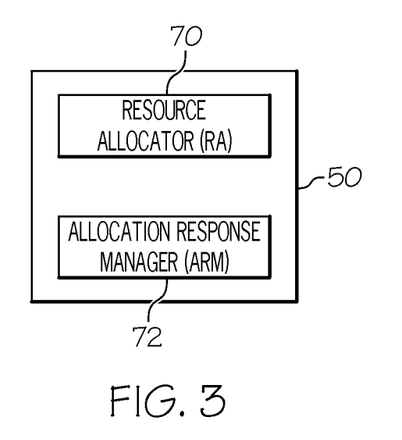
FIG. 3 depicts a diagram of the computing resource allocation engine/program according to embodiment of the present invention.

Next, RA 70 works to provide an answer based on the following components:
1) An analysis of information in databases 58A-N;
2) The use of additional computing resources 66 is automatically triggered when confidence level (e.g. regarding an answer to a question) is low.
3) An analysis of past user 54 queries, along with a user profile that specifies information about the user 54.

It is noted that RA 70 may optionally make use of a user profile, stored on a device 62 that specifies various aspects of a user 54, such as the following: purpose for RA 70, state of need, fields of interest, nationality of user 54, geography, language of user 54, job of user 54, manually input word combinations, etc. The profile may be queried to aid the system in providing a relevant and/or higher-confidence answer.

Regardless, RA 70 may perform an analysis and computation over a continuous stream of text input from sensors such as speech recognition, human keyboard inputs, cell phone outputs, etc. A microphone may be used to detect the user 54's speech input, if and when useful. In any event, a search will be conducted based on content of the query, and response 64 identified.

A confidence value is determined for the response 64 and is updated at regular intervals to indicate how sure the system is with respect to a response 64. In general, the confidence level can be based on multiple factors such as a speed with which the response 64 is identified, an amount of computing resources 60 (e.g., in resource pool 68) utilized to identify the response 64, a quantity of the one or more databases 58A-N accessed to identify the response 64, or historical data associated with previous queries submitted by the querying user 54 (e.g., in repository 62), etc.

The system may help the querying user 54 frame his or her questions to optimize the value or accuracy of the returned list of experts. Confidence values, for example, may grow as additional processors are used to scan information. If sufficient information is available in a short amount of time in the data stored for analysis, the confidence value should grow to some threshold. At this point, the action-taking component is allowed to take action and prompt the user 54 and/or provide a response 64 to the user 54. It is noted that that the confidence level can be indicated (e.g., by a visual indicator, audio indicator, textual change, speech change (e.g. louder if more confident, or switching to a different voice when more confident)).

Shown below are illustrative steps for this example:
1. A user 54 is speaking or typing, and the RA monitors such input.
2. The RA 70 analyzes such input and attempts to provide a useful answer (e.g. answer a question about hardware design).
3. A confidence level is associated with the current possible answer to the question (e.g., 70%).
4. If confidence level with respect to an expert is below a threshold after time "T", trigger RA 70 to use more resources (e.g. processors, memory) (novel step).
5. When confidence is above a threshold, the RA 70 conveys the answer to the user 54.

It is understood that Step 2 may be conducted using a machine learning mechanism to perform a pervasive confidence estimate. The system ultimately produces a ranked list of answers (i.e., of possible responses to provide to a user 54), each with a confidence value (to decide whether or not to "risk" providing an answer to the user 54 in a particular situation) and associated with a collection of supporting evidence. If the confidence value is above a threshold, then the system conveys the answer to the user 54. An Unstructured Information Management Architecture (UIMA) may be used to facilitate the Natural Language Processing (NLP).

Also, it is understood that in Step 3, the querying user 54 may specify the desired confidence level, and, additionally, provide the price he/she is willing to receive an answer with that level of confidence. More generally, this specification of price and confidence level could be continuous or tiered.

Resources to be allocated may include, but are not limited to:
CPU time
Number of processors
Random access memory and virtual memory
Hard disk space
Network throughput
Electrical power
External devices
Input/output operations
Number and type of virtual machines and operating systems
Queue priority and schedulers Resource handles may be used to identify resources that are requested for access based on the value of the "confidence level." The resource handles may be integer numbers, or they can be pointers that allow access to further information. Common resource handles are file descriptors and sockets. Access to additional memory areas may be controlled by semaphores, and access to resources may be regulated by queuing. The controlling algorithm of the task queue may be controlled by a scheduler. RA 70 may be used to rapidly allocate and de-allocate resources for various queries run by the proposed invention. Moreover, RA 70 may allocate resources using various methods. Some examples of methods are described below:

Schedule-Based Allocation

In this method, the proposed system has an array of resources pre-allocated for use. This system is used when a new query is placed into the queue. The schedule-based allocation system determines the run order for various incoming queries. The system may even preempt currently executing queries, if the priority and remaining time of the incoming jobs compared to the running jobs indicates that preemption is necessary. The schedule-based system allows for rapid execution of incoming tasks since all resources are pre-allocated.

Cloud-Based Allocation

This method allocates new resources within a public or private cloud for processing requests. The system may preemptively allocate additional cloud resources based on current and queued load. For example, the system may detect that it is presently using 90% of its available resources and thus begin to provision new instances in a cloud for additional resources. When load drops below a specified threshold, those resources may be released.

CPU Type-Based Allocation

This method optimizes resource allocation based on query type. For example, it is known that deep QA systems use multiple algorithms in parallel to arrive at a likely answer. Some algorithms may be processed faster using RISC-based systems and other using CISC-based systems. As such, depending on the question and the time to answer, the resource allocator may allocate or schedule jobs across different system types to optimize the answering time. Additionally, some system types may be cheaper to operate than others. For example, it is common for Complex Instruction Set Computing (CISC)-based systems to cost a fraction of Reduced Instruction Set Computing (RISC)-based systems. Therefore, if a rapid answer is not needed, the system may select to run all algorithms on CISC-based systems to reduce operating cost.

As further shown in FIG. 3, an Allocation Resource Manager (ARM 72) may be provided to determine if there is any latency for RA 70 consideration. If a request for allocation/de-allocation cannot be immediately fulfilled, then the requests may have to be queued, scheduled, and serviced. A "service period" is associated with the process to fulfill this queued RA 70 request. The ARM 72 will determine a Service Response Confidence Level (SRCL) probability, which is computed by comparing the "service period", response time, and confidence-level needed to produce an accurate answer. This comparison may be important to understand:

- Whether there is an impact to producing a real-time answer. Example: Service period is too long→Therefore, unlikely to produce an answer→This is expected to produce a lower confidence level.
- Whether the RA 70 should be triggered to reprioritize or recalculate its methods of allocating resources. Example: low SRCL probability provided to RA 70→RA 70 determines that it should request "better" resources for allocation/de-allocation→another SRCL probability is determined→Repeat until desired SRCL probability achieved.

Along these lines, ARM 72 works in parallel with RA 70 as explained above to perform micro-calculations of the SRCL probability and to feed it to RA 70 in order for it to continuously allocate/de-allocate resources.

Figure 4:
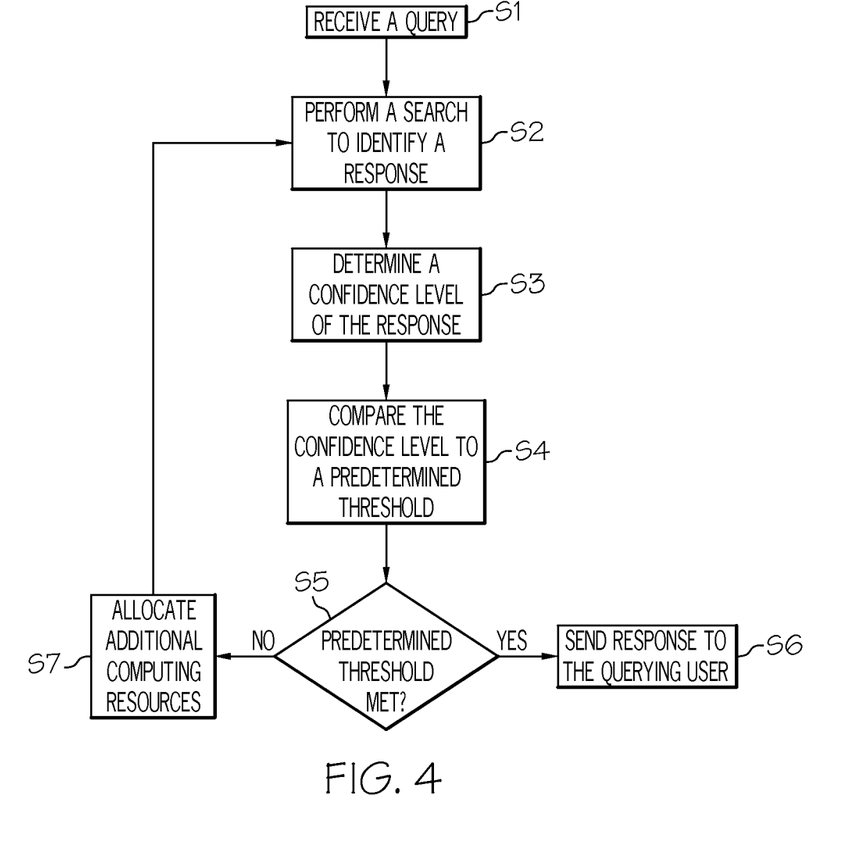
FIG. 4 depicts a method flow diagram according to an embodiment of the present invention.

Referring now to FIG. 4, a method flow diagram according to an embodiment of the present invention is shown. In step S1, a query is received from a querying user into a computer storage medium; In step S2, a search of one or more databases is performed based on the query to identify a response to the query. In step S3, a confidence level associated with the response is determined on at least one of the following: a speed with which the response is identified, an amount of computing resources utilized to identify the response, a quantity of the one or more databases accessed to identify the response, or historical data associated with previous queries submitted by the querying user. In step S4, the confidence level is compared to a predetermined threshold, and in step S5, it is determined whether the predetermined threshold has been met. If so, the response can be sent to the querying user in step S6. If not, additional computing resources are allocated in step S7. Once additional computing resources have been allocated, the process can iteratively return to step S2 until the predetermined threshold has been met. That is, the search, response, and confidence level can continuously be updated until the predetermined threshold has been met.

While shown and described herein as a confidence-based computing resource allocation system, it is understood that the invention further provides various alternative embodiments. For example, in one embodiment, the invention provides a computer-readable/useable medium that includes computer program code to enable a computer infrastructure to provide confidence-based computing resource allocation functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable structure storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide confidence-based computing resource allocation functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for confidence-based computing resource allocation. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable structure for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for confidence-based computing resource allocation in a networked computing environment, comprising:
    receiving a deep question and answer (DeepQA) natural language query from a querying user into a computer storage medium;
    performing a search of one or more databases based on the query to identify a response to the query, the response being in response to a single query;
    determining a confidence level specific to the response to the single query based on the following: a speed with which the response is identified, an amount of computing resources utilized to identify the response, a quantity of the one or more databases accessed to identify the response, and historical data associated with previous queries submitted by the querying user;
    comparing the confidence level to a predetermined threshold on a query-by-query basis;
    responsive to the confidence level not meeting the predetermined threshold, allocating an additional amount of computing resources and continuing to perform the search to identify the response to the single query based on the additional amount of computing resources; and
    sending the response to the querying user when the confidence level meets the predetermined threshold.

2. The computer-implemented method of claim 1, further responsive to the allocation of the additional amount of computing resources:
    updating the search to yield an updated response; and
    updating the confidence level based on the updated response.

3. The computer-implemented method of claim 1, further comprising analyzing previous queries from the querying user to identify the response.

4. The computer-implemented method of claim 1, further comprising accessing a user profile associated with the querying user to identify the response.

5. The computer-implemented method of claim 4, the user profile comprising at least one of the following: a field of interest associated with the querying user, a geographic region associated with the querying user, or a language of the querying user.

6. The computer-implemented method of claim 1, the computing resources comprising at least one of the following: central processing unit speed, a quantity of processors, random access memory availability, hard disk space, network throughout, electrical power availability, external device operability, input/output (I/O) operations, a quantity of virtual machines available, or queue priority and scheduling.

7. The computer-implemented method of claim 1, the network computing environment comprising at least one of the following, a cloud computing environment, or a grid computing environment.

8. A system for confidence-based computing resource allocation in a networked computing environment, comprising:
    a memory medium comprising instructions;
    a bus coupled to the memory medium; and
    a processor coupled to the bus that when executing the instructions causes the system to:
        receive a deep question and answer (DeepQA) natural language query from a querying user into a computer storage medium;
        perform a search of one or more databases based on the query to identify a response to the query, the response being in response to a single query;
        determine a confidence level specific to the response to the single query based on the following: a speed with which the response is identified, an amount of computing resources utilized to identify the response, a quantity of the one or more databases accessed to identify the response, and historical data associated with previous queries submitted by the querying user;
        compare the confidence level to a predetermined threshold on a query-by-query basis;
        responsive to the confidence level not meeting the predetermined threshold, allocate an additional amount of computing resources and continuing to perform the search to identify the response to the single query based on the additional amount of computing resources; and
        send the response to the querying user when the confidence level meets the predetermined threshold.

9. The system of claim 8, the memory medium further comprising instructions for causing the system, responsive to the allocation of the additional amount of computing resources to:
    update the search to yield an updated response; and
    update the confidence level based on the updated response.

10. The system of claim 8, the memory medium further comprising instructions for causing the system to analyze previous queries from the querying user to identify the response.

11. The system of claim 8, the memory medium further comprising instructions for causing the system to access a user profile associated with the querying user to identify the response.

12. The system of claim 11, the user profile comprising at least one of the following: a field of interest associated with the querying user, a geographic region associated with the querying user, or a language of the querying user.

13. The system of claim 8, the computing resources comprising at least one of the following: central processing unit speed, a quantity of processors, random access memory availability, hard disk space, network throughout, electrical power availability, external device operability, input/output (I/O) operations, a quantity of virtual machines available, or queue priority and scheduling.

14. The system of claim 8, the network computing environment comprising at least one of the following, a cloud computing environment, or a grid computing environment.

15. A computer program product for confidence-based computing resource allocation in a networked computing environment, the computer program product comprising a non-transitory computer readable storage media, and program instructions stored on the computer readable storage media, to:

receive a deep question and answer (DeepQA) natural language query from a querying user into a computer storage medium;
perform a search of one or more databases based on the query to identify a response to the query, the response being in response to a single query;
determine a confidence level specific to the response to the single query based on the following: a speed with which the response is identified, an amount of computing resources utilized to identify the response, a quantity of the one or more databases accessed to identify the response, and historical data associated with previous queries submitted by the querying user;
compare the confidence level to a predetermined threshold on a query-by-query basis;
responsive to the confidence level not meeting the predetermined threshold, allocate an additional amount of computing resources and continuing to perform the search to identify the response to the single query based on the additional amount of computing resources; and
send the response to the querying user when the confidence level meets the predetermined threshold.

16. The computer program product of claim 15, the computer readable storage media further comprising instructions, responsive to the allocation of the additional amount of computing resources to:
update the search to yield an updated response; and
update the confidence level based on the updated response.

17. The computer program product of claim 15, the computer readable storage media further comprising instructions to analyze previous queries from the querying user to identify the response.

18. The computer program product of claim 15, the computer readable storage media further comprising instructions to access a user profile associated with the querying user to identify the response.

19. The computer program product of claim 18, the user profile comprising at least one of the following: a field of interest associated with the querying user, a geographic region associated with the querying user, or a language of the querying user.

20. The computer program product of claim 15, the computing resources comprising at least one of the following: central processing unit speed, a quantity of processors, random access memory availability, hard disk space, network throughout, electrical power availability, external device operability, input/output (I/O) operations, a quantity of virtual machines available, or queue priority and scheduling.

21. The computer program product of claim 15, the network computing environment comprising at least one of the following, a cloud computing environment, or a grid computing environment.

22. A method for deploying a system for confidence-based computing resource allocation in a networked computing environment, comprising:
providing a computer infrastructure being operable to:
receive a deep question and answer (DeepQA) natural language query from a querying user into a computer storage medium;
perform a search of one or more databases based on the query to identify a response to the query, the response being in response to a single query;
determine a confidence level specific to the response to the single query based on the following: a speed with which the response is identified, an amount of computing resources utilized to identify the response, a quantity of the one or more databases accessed to identify the response, and historical data associated with previous queries submitted by the querying user;
compare the confidence level to a predetermined threshold on a query-by-query basis;
responsive to the confidence level not meeting the predetermined threshold, allocate an additional amount of computing resources and continuing to perform the search to identify the response to the single query based on the additional amount of computing resources; and
send the response to the querying user when the confidence level meets the predetermined threshold.

* * * * *